(12) United States Patent
Yong

(10) Patent No.: US 10,454,402 B2
(45) Date of Patent: Oct. 22, 2019

(54) ROTATING DECORATIVE LAMP WITH OVERLAPPING IMAGES

(71) Applicant: MerchSource, LLC, Irvine, CA (US)

(72) Inventor: Raymond Yong, Shanghai (CN)

(73) Assignee: MerchSource, LLC, Irvine, CA (US)

( * ) Notice: Subject to any disclaimer, the term of this patent is extended or adjusted under 35 U.S.C. 154(b) by 24 days.

(21) Appl. No.: 14/995,720

(22) Filed: Jan. 14, 2016

(65) Prior Publication Data

US 2016/0312982 A1 Oct. 27, 2016

Related U.S. Application Data

(60) Provisional application No. 62/079,902, filed on Nov. 14, 2014.

(51) Int. Cl.

| F21V 14/08 | (2006.01) |
| F21V 23/00 | (2015.01) |
| H02P 7/28 | (2016.01) |
| F21S 10/00 | (2006.01) |
| G09F 13/00 | (2006.01) |
| H05B 33/08 | (2006.01) |
| H02P 7/285 | (2016.01) |
| F21S 9/02 | (2006.01) |
| F21W 121/00 | (2006.01) |
| F21Y 115/10 | (2016.01) |

(52) U.S. Cl.
CPC ........... *H02P 7/28* (2013.01); *F21S 10/00* (2013.01); *G09F 13/00* (2013.01); *H02P 7/285* (2013.01); *H05B 33/0842* (2013.01); *F21S 9/02* (2013.01); *F21W 2121/00* (2013.01); *F21Y 2115/10* (2016.08)

(58) Field of Classification Search
CPC ....... F21S 10/007; A47F 3/00; F21W 2121/00; F21W 2131/30
USPC .................................. 362/125, 124, 311.13
See application file for complete search history.

(56) References Cited

U.S. PATENT DOCUMENTS

| D173,730 S | 12/1954 | Helms | |
| 4,591,955 A * | 5/1986 | Kallay | F21S 10/00 362/101 |
| 5,685,097 A * | 11/1997 | Marinov | G09F 19/08 362/283 |
| D427,709 S | 7/2000 | Lee et al. | |
| D429,839 S | 8/2000 | Ling | |
| D436,419 S | 1/2001 | Lin | |
| D437,965 S | 2/2001 | Diviak, Sr. | |
| D450,407 S | 11/2001 | Hsieh | |
| D459,530 S | 6/2002 | Dolan | |
| D465,874 S | 11/2002 | Garvin et al. | |

(Continued)

OTHER PUBLICATIONS

Rotating Fish Lamp; http://www.icollector.com/Rotating-Fish-Lamp_i14907877; printed from website on Jan. 14, 2019.

(Continued)

*Primary Examiner* — Alexander K Garlen
*Assistant Examiner* — Eric T Eide
(74) *Attorney, Agent, or Firm* — Avyno Law P.C.

(57) ABSTRACT

An illuminated lamp with rotating film imagery is provided with improved integrated circuitry that is powered by parallel and equal DC power sources and that includes a LED light source and motor that may be controlled by the integrated circuitry to operate together or independently.

10 Claims, 4 Drawing Sheets

(56) References Cited

U.S. PATENT DOCUMENTS

| | | | |
|---|---|---|---|
| D471,663 S | 3/2003 | Olson | |
| D474,558 S | 5/2003 | Lee | |
| 6,584,713 B2* | 7/2003 | Huang | G09F 19/02 |
| | | | 362/811 |
| D486,601 S | 2/2004 | Shen | |
| D591,895 S | 5/2009 | Sabernig | |
| D612,092 S | 3/2010 | Finkle | |
| 9,395,061 B2* | 7/2016 | Yang | F21V 1/10 |
| 9,453,626 B2* | 9/2016 | Ruiz Bonet | G09F 19/02 |
| 9,734,768 B1* | 8/2017 | Shapiro | G09G 3/3433 |
| D817,530 S | 5/2018 | Beukema et al. | |
| 2007/0246098 A1 | 10/2007 | Burke, Jr. et al. | |
| 2012/0081905 A1* | 4/2012 | Santiago | F21V 1/22 |
| | | | 362/294 |
| 2012/0134150 A1* | 5/2012 | Catalano | F21V 29/83 |
| | | | 362/231 |
| 2013/0223043 A1* | 8/2013 | Ray | F21V 33/00 |
| | | | 362/96 |
| 2014/0254173 A1 | 9/2014 | Jackson | |
| 2016/0053969 A1* | 2/2016 | Wang | A47G 33/08 |
| | | | 362/311.13 |
| 2016/0245466 A1* | 8/2016 | Law | F21L 4/005 |

OTHER PUBLICATIONS

Rabbit Tanaka Aquarium Motion Lamp Fish Sea Coral Rotating Nightlight Ocean 2002; https://www.ebay.ie/itm/231300683910; printed from website on Jan. 14, 2019.

Innovage Recalls Discovery Kids Lamps Due to Fire and Burn Hazards; https://www.cpsc.gov/Recalls/2012/innovage-recalls-discovery-kids-lamps-due-to-fire-and-burn-hazards; printed from website on Jan. 14, 2019.

* cited by examiner

ROTATING DECORATIVE LAMP WITH OVERLAPPING IMAGES

RELATED APPLICATIONS

This application claims priority of U.S. application Ser. No. 62/079,902, filed on Nov. 14, 2014, titled ROTATING DECORATIVE LAMP WITH OVERLAPPING IMAGES, which application is incorporated in its entirety by reference in this application.

BACKGROUND OF THE INVENTION

1. Field of the Invention

The invention relates to a lamp and, in particular, a rotating decorative lamp with overlapping images.

2. Related Art

Illuminated colored display devices that provide visual effects to the user by having multiple rotating overlapping internal films that rotate in opposite directions are known in the art. Visual effects of changing patterns and/or moving objects within scenery are often provided by such illuminated color display devices. For example, the front film may have an ocean scene and the back film may have fish on the film, which when the films move, the films provide the effect of fish swimming in the ocean.

The drawback to the prior art illuminated color display devices is that they have all been controlled by one AC source. Thus, the motor rotating the film and compact fluorescent light bulb ("CFL") of the prior art work synchronistically when the unit is powered on. Thus, the rotating film and the light are always on continuously unless the user powers off the unit. Given the inefficiencies and inflexibilities of the prior art, a need exists to allow independent operation of the motor and the light in order to conserve and save energy and to better control the operation of the illumination devices for efficiency and safety purposes.

SUMMARY

An illuminated lamp with rotating film imagery is provided with improved integrated circuitry that is powered by parallel and equal DC power sources. The lamp includes a base; a translucent housing; a top cap; at least a first and second rotating film, where the second film is smaller than the first film and is placed within the circumferences of, or behind, the first film. A motor housed within the base for rotating the first and second firms in opposing directions and an LED light source is positioned behind the first and second firms for illuminating the films. The lamp is powered by at least at least two DC power sources positioned in parallel. An integrated circuit is provided that enables the following modes of operation of the lamp: (i) the powering on of both the motor and LED light source together; and (ii) the powering of only the LED lighting element without the motor. Optionally, the integrated circuit may include a timer for shutting off either or both the LED light source and motor after a predetermined time.

Other devices, apparatus, systems, methods, features and advantages of the invention will be or will become apparent to one with skilled in the art upon examination of the following figures and detailed description. It is intended that all such additional systems, methods, features and advantages be included within this description, be within the scope of the invention, and be protected by the accompanying claims.

BRIEF DESCRIPTION OF THE FIGURES

The invention may be better understood by referring to the following figures. The components in the figures are not necessarily to scale, emphasis instead being placed upon illustrating the principles of the invention. In the figures, like reference numerals designate corresponding parts throughout the different views.

DETAILED DESCRIPTION

Lamps with opposing rotating images are known in the prior art. One example of a prior art patent that teaches the dual rotation of films within a lamp is found is in U.S. Pat. No. 5,685,097, which is incorporated in this application in its entirety by reference.

Figures 1, 2:
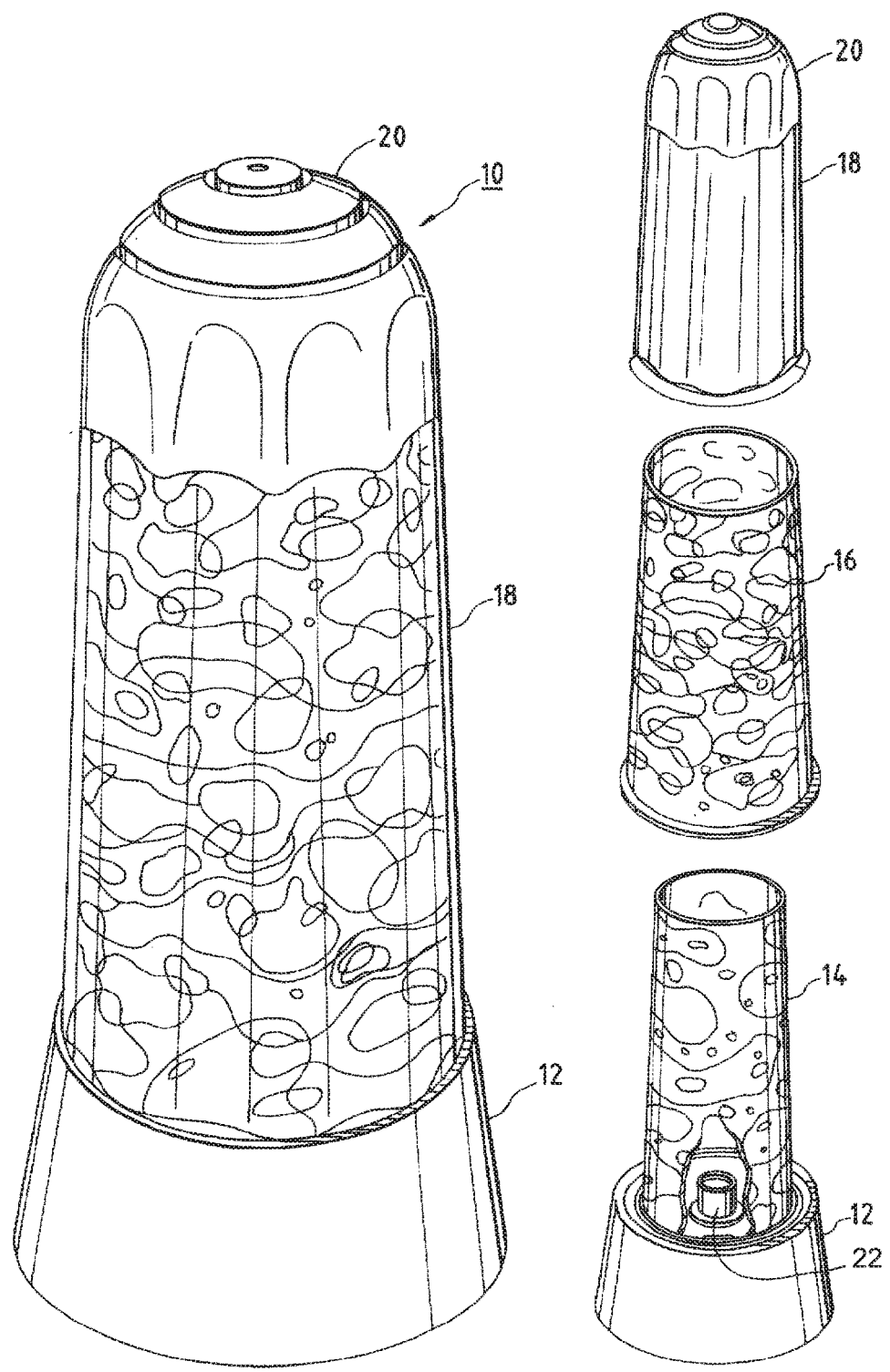
FIG. 1 (Prior Art) is a prior art lamp with opposing rotating images.
FIG. 2 (Prior Art) is an exploded view of the prior art lamp of FIG. 1.

FIGS. 1 and 2 illustrate the prior art lamp 10 taught by U.S. Pat. No. 5,685,097. FIG. 1 (Prior Art) is a prior art lamp with opposing rotating images, and FIG. 2 (Prior Art) is an exploded view of the prior art lamp of FIG. 1.

As illustrated in attached FIGS. 1 and 2, a decorative lamp 10 having a base 12, top cap 20 and translucent housing 18. Sitting on the base within the housing are two overlapping opposing generally translucent film images 12 and 14. Within the base of the lamp 10 is a motor (not shown) which rotates the films about a lighting element 22 in opposing directions. The light 22 is positioned within the lamp behind the rotating films 12, 14 to illuminate the films. The prior art illustrated in FIGS. 1 and 2 is taught by U.S. Pat. No. 5,685,097.

One translucent member 12 is of a larger diameter than the other translucent member 14 such that one translucent member 12 may be placed around the other 14. In this manner, one film image 12 rotates in front of the other 14. As discussed previously, the prior art units are A/C powered devices.

Figure 3:
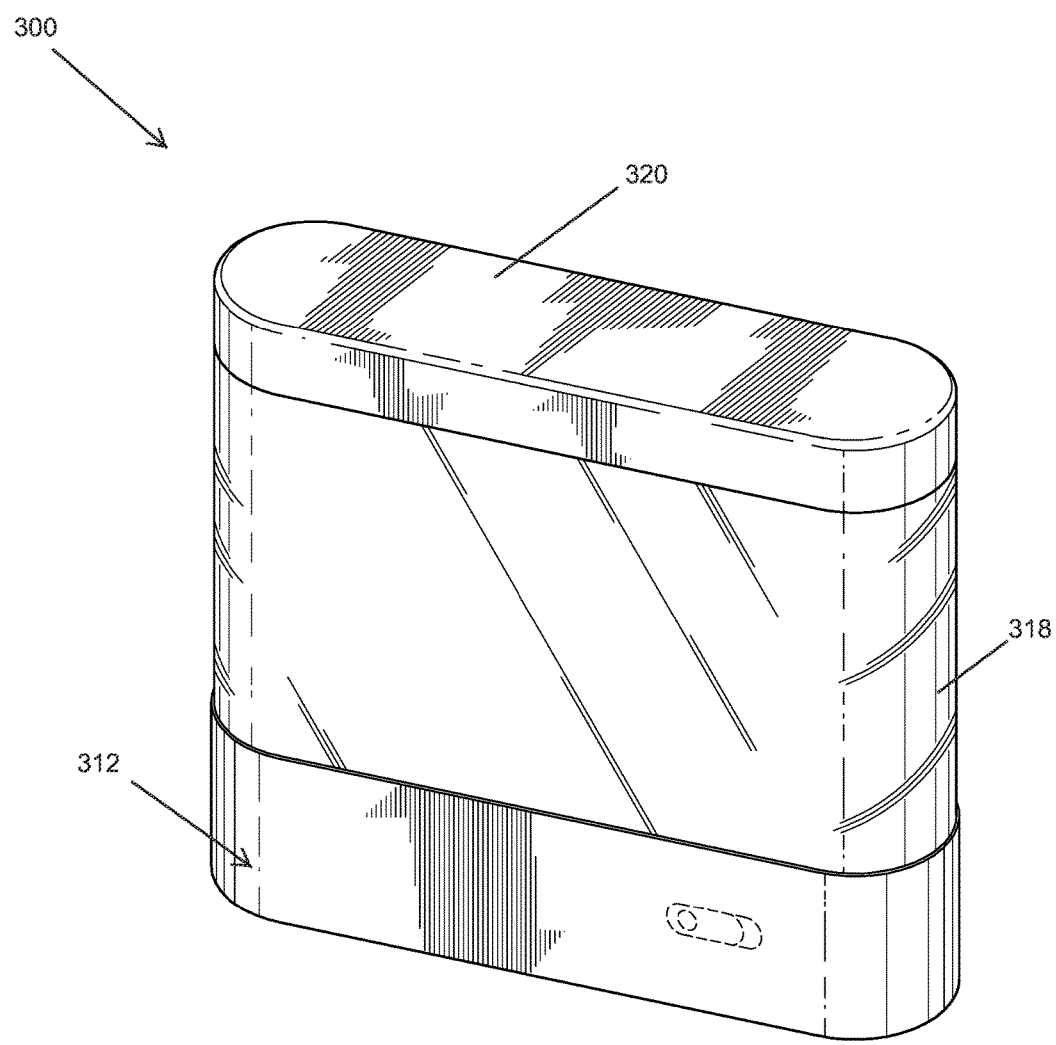
FIG. 3 illustrates a lamp of the present invention.
Figure 4:
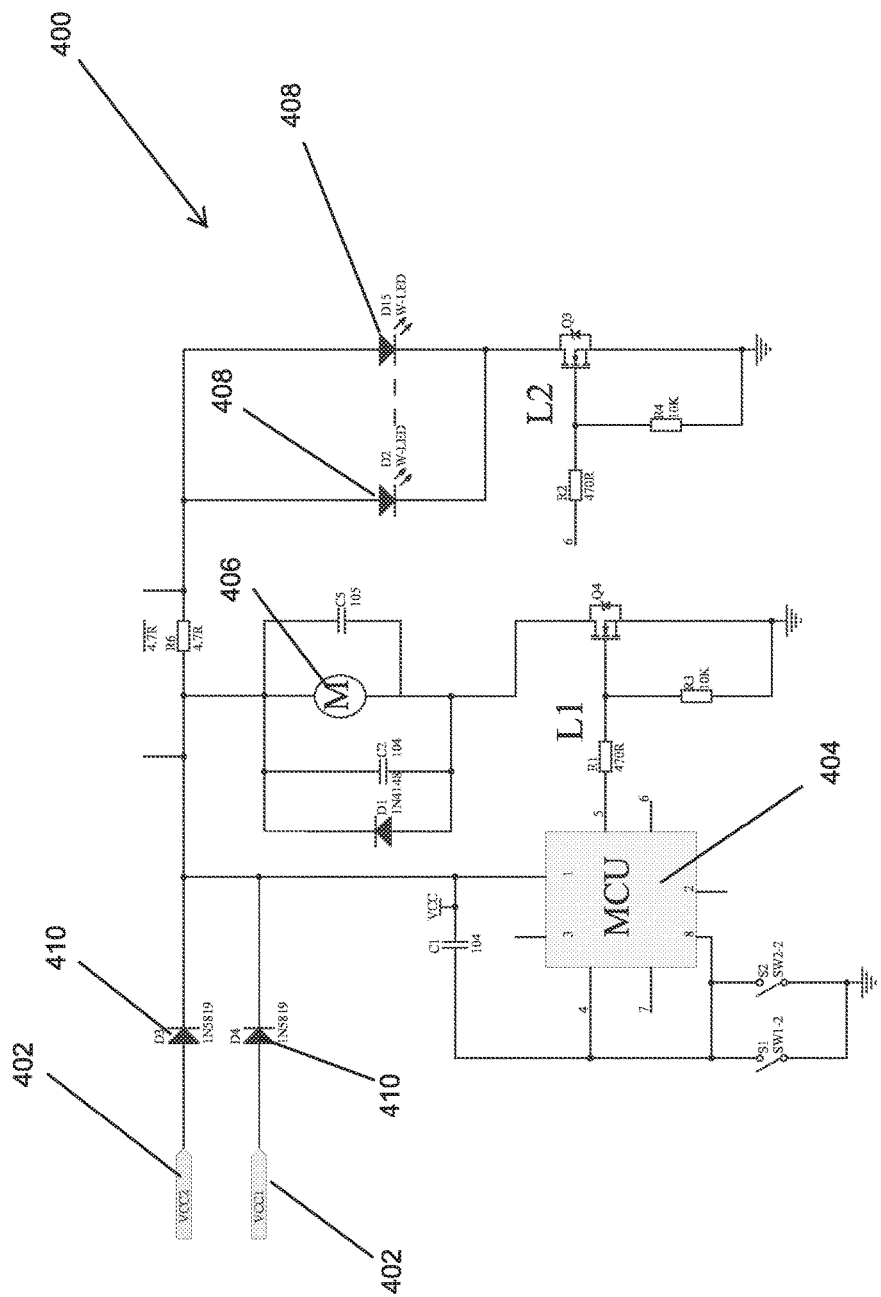
FIG. 4 illustrates a circuit diagram for controlling and powering the lamp of the present invention.
Figure 5:
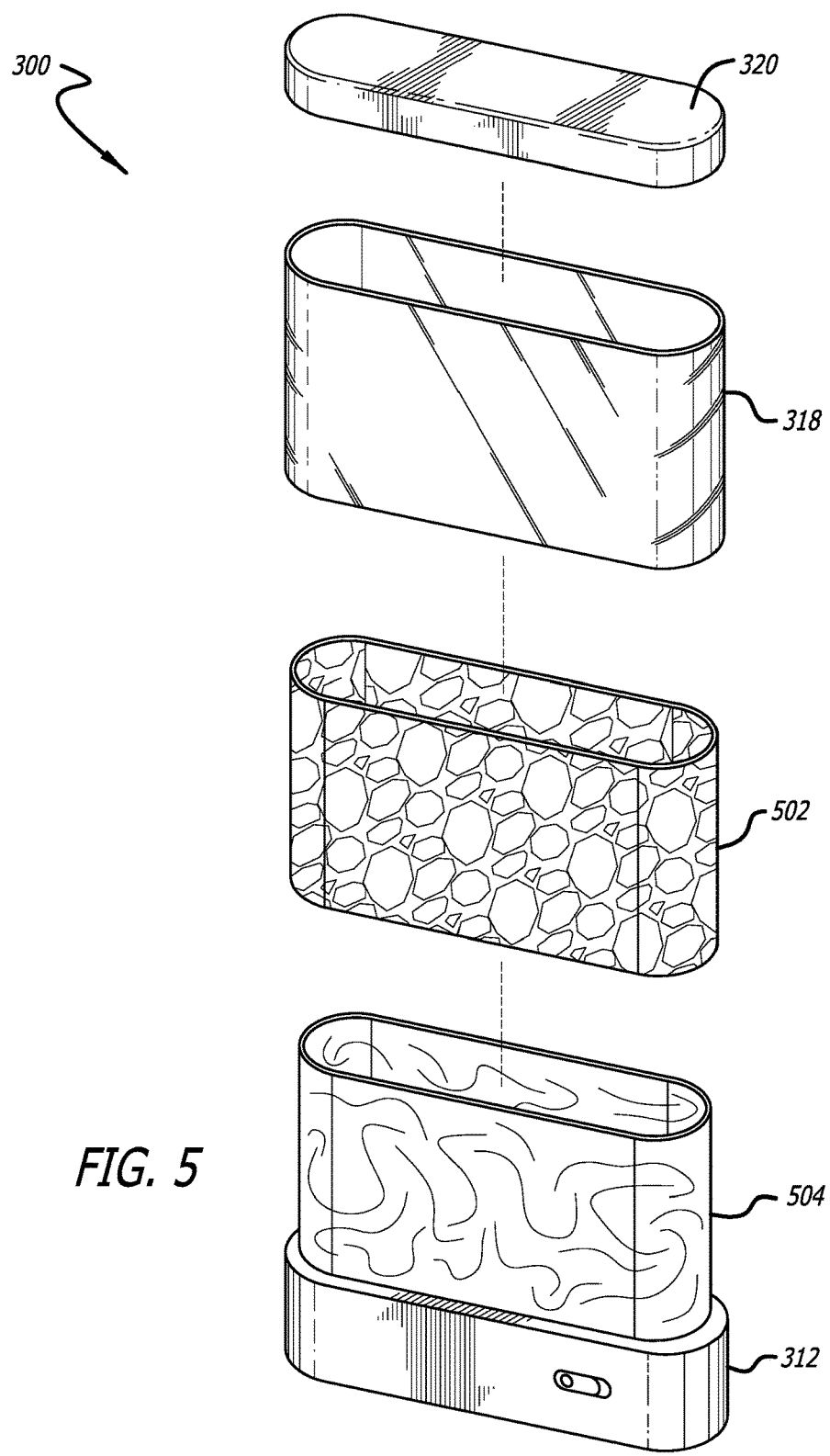

FIG. 3 illustrates one example of lamp 300 of the present invention having improved function provided by the circuitry 400 illustrated in FIG. 4. The lamp 300 of FIG. 3 also includes all the following prior art components illustrated in FIGS. 1 & 2: base 310, top cap 320 and translucent housing 318. Like the lamp in FIGS. 1 & 2, the lamp 300, includes the two overlapping opposing rotating film images 502, 504 (shown in FIG. 5), a light positioned behind the films to illuminate the images and a motor to rotates the films about the light in opposing directions. Rather than being round or cylindrical, the lamp 300 of FIG. 3 has an oblong shaped to maximize the viewing area. In particular, as shown in FIGS. 3 and 5, the translucent housing 318 may have a racetrack oval shape where the housing 318 has straight front and rear sides that are parallel to one another. Additionally, as most clearly shown in FIG. 5, both the first and second rotating films 502, 504 may fit within the translucent housing 318 and may be of the same racetrack oval shape as the translucent housing 318.

FIG. 4 is one example of a circuit 400 for controlling and powering the lamp 300 of the present invention. Unlike the prior art lamps, the lamp of FIG. 3 runs on a DC power supply that has a parallel power source 402 with a 1.5V C size alkaline battery capacity with about 7800 mAh. For example, six 1.5V C size batteries can be used. The lamp can also run on a 9V input voltage (6×1.5V) with a capacity of only 7800 mAh. In this application, a parallel circuit can be used to achieve two equal power sources 402 for the product in which each of them has an operation input voltage of, for example, 4.5V (3 pcs×1.5V), which can extend the service hours by twice (i.e. 15600 mAh).

As illustrated in FIG. 4, two 4.5V battery power sources 402 are used to power the lamp 300. This parallel circuit for DC supply can be extended to two or more power sources 402 depending on the space availability of the product. For illustration, two sources 402 are shown.

As noted above, power sources 402 share the same voltage value (e.g. 4.5V per each) and the diodes D3 & D4 401 keep the voltages protected if either group of batteries voltage is lower than another. The circuit includes a microcontroller 404 (i.e., IC) for controlling the various operations of the lamp 300, as will described further below. The circuit further includes a motor 406 for controlling the operation/rotation of the films and LED (light emitting diode) lighting elements are provided at 408, which, in the illustrated example, are white LED lamps. While the circuit 400 shows the use of the two LED lighting elements 408, it would be possible to use one LED lighting element 408 or, conversely, more than two LED lighting elements 408.

Unlike the prior art, in the illustrated example of FIG. 4, an integrated circuit or microcontroller 404 is provided that can be programmed with different modes by one button where circulation can be used to increase the overall service-hours. In this way, using the programmed integrated circuit, different modes of operation may be provided. The following modes, for example, may be provided: (i) the animated film rotary and lighting element (e.g., LED) may work synchronously; (ii) the lighting element will only be on (with no animated film movement); and (iii) a shut off timer may be provided to shut of either or both the LED and the animated film rotary. It is also possible to provide for film rotation without the lamp; however, this mode is less desirable as the user will not have the effect of the transparent illuminated film. Since the design allows the selection of modes, power saving options are provided to the user to increase battery life and in service hours.

Further, the current design, use LED lighting, which does not require an electrical ballast that would be required for a compact fluorescent light bulb ("CFL"). The lamp 300 can simply be powered by DC supply and battery, like a common flashlight with direct battery connection. Further, the lamp 300 contains one bank for batteries thereby containing all of the circuitry in one compartment.

The foregoing description of an implementation has been presented for purposes of illustration and description. It is not exhaustive and does not limit the claimed invention to the precise form disclosed. Modifications and variations are possible in light of the above description or may be acquired from practicing the invention. The claims and their equivalents define the scope of the invention.

What is claimed is:

1. A lamp comprising:
a base;
a translucent housing having a generally racetrack oval shape, the housing having a flat front face and a flat rear face, where the flat front and rear faces are parallel to one another;
a top cap;
at least a first and second rotating film, where the second film is smaller than the first film and is placed within the circumference of, or behind, the first film;
a motor housed within the base for rotating the first and second firms in opposing directions;
an LED light source positioned behind the first and second firms for illuminating the films;
a programmable integrated circuit programmed with different modes of operation which are controllable by a single button; and
at least two DC power sources where each DC power source shares the same battery voltage value and where each DC power source is protected by a diode to increase the battery voltage life, where the lamp is powered by the two DC parallel power sources and controlled by the programmable integrated circuit to enable the LED light sources and films to operate both simultaneously and independently of one another.

2. The lamp of claim 1 where the DC power sources are equal power sources.

3. The lamp of claim 1 where the integrated circuit further includes a timer for shutting off either or both the LED light source after a predetermined time has passed.

4. A lamp comprising:
a base;
a translucent housing having a generally racetrack oval shape, the housing having a flat front face and a flat rear face, where the flat front and rear faces are parallel to one another;
a top cap;
at least a first and second rotating film, where the second film is smaller than the first film and is placed within the circumference of, or behind, the first film;
a motor housed within the base for rotating the first and second firms in opposing directions;
an LED light source positioned behind the first and second firms for illuminating the films;
a programmable integrated circuit programmed with different modes of operation which are controllable by a single button; and
at least two DC power sources where each DC power source shares the same battery voltage value and where each DC power source is protected by a diode to increase the battery voltage life, where the lamp is powered by the two DC parallel power sources and controlled by the programmable integrated circuit having a timer that can be programmed to enable the following modes of operation of the lamp: (i) the powering on of both the motor and LED light source together; (ii) the powering of only the LED lighting element without the motor; and (iii) shutting off either or both the LED light source and motor after a predetermined time.

5. The lamp of claim 1 where the first rotating film fits within the translucent housing and is of the same shape as the translucent housing.

6. The lamp of claim 1 where the second rotating film fits within the translucent housing and is of the same shape as the translucent housing.

7. The lamp of claim 1 where the first and second rotating films fit within the translucent housing and are of the same shape as the translucent housing.

8. The lamp of claim 4 where the first rotating film fits within the translucent housing and is of the same shape as the translucent housing.

9. The lamp of claim 4 where the second rotating film fits within the translucent housing and is of the same shape as the translucent housing.

10. The lamp of claim 4 where the first and second rotating films fit within the translucent housing and are of the same shape as the translucent housing.

* * * * *